United States Patent [19]

Streu et al.

[11] Patent Number: 4,731,392

[45] Date of Patent: Mar. 15, 1988

[54] PROCESS FOR THE PREPARATION OF POLYESTER POLYOLS, BASED ON 2-METHYL-1,4-BUTANEDIOL, WHICH ARE LIQUID AT ROOM TEMPERATURE, AND THEIR USE FOR THE PREPARATION OF PLASTIC MATERIALS

[75] Inventors: Joachim Streu, AM Huettenwingert; Wolfgang Straehle, Hampenweg, both of Fed. Rep. of Germany

[73] Assignee: BASF Aktiengesellschaft, Ludwigshafen, Fed. Rep. of Germany

[21] Appl. No.: 36,298

[22] Filed: Apr. 9, 1987

[30] Foreign Application Priority Data

Apr. 25, 1986 [DE] Fed. Rep. of Germany ....... 3614038

[51] Int. Cl.⁴ ............................................. C08G 18/14
[52] U.S. Cl. ..................................... 521/172; 521/173; 528/81; 528/83; 528/272; 528/296; 528/300; 560/198
[58] Field of Search .................. 521/172, 173; 528/81, 528/83, 272, 296, 300; 560/198

[56] References Cited

U.S. PATENT DOCUMENTS 3,859,257  1/1975  Schade et al. ..................... 528/272

Primary Examiner—Maurice J. Welsh
Attorney, Agent, or Firm—Bill C. Panagos

[57] ABSTRACT

This invention relates to polyester polyols which are liquid at 25° C. and contain units having the structure —OCH$_2$—CH(CH$_3$)—CH$_2$CH$_2$O— which are bound together and have an average functionality of from about 2 to 3, a hydroxyl number of from about 25 to 300, an acid number of less than about 2, and a viscosity of from about 200 to 10$^5$ mPas at 25° C. The polyols are prepared through polycondensation in the molten state, in the presence of or absence of esterification catalysts, of an aliphatic di- and/or polycarboxylic acid and/or di- and/or polycarboxylic acid ahydride and 2-methyl-1,4-butanediol or mixtures comprised of 2-methyl-1,4-butanediol and at least one linear or branched, aliphatic di- through tetravalent alcohol, which optionally contains ether bridges and has a 2-methyl-1,4-butanediol content of at least 20 weight percent based on the weight of the alcohol mixture. The polyester polyols are suited for the preparation of non-cellular or cellular polyurethane plastics or polyurethane-polyurea plastics and preferably polyurethane elastomers, using the polyisocyanates addition polymerization process.

17 Claims, No Drawings

PROCESS FOR THE PREPARATION OF POLYESTER POLYOLS, BASED ON 2-METHYL-1,4-BUTANEDIOL, WHICH ARE LIQUID AT ROOM TEMPERATURE, AND THEIR USE FOR THE PREPARATION OF PLASTIC MATERIALS

BACKGROUND OF THE INVENTION

1. Field of the Invention

This invention relates to the development of low viscosity polyester polyols which are liquid at room temperature and can be processed on conventional machines using the polyisocyanate-addition polymerization process, to form cellular and/or noncellular plastics exhibiting excellent mechanical properties.

This invention further relates to the use of 2-methyl-1,4-butanediol in the preparation of low viscosity polyester polyols which are liquid at room temperature.

2. Description of Material Art

The preparation of polyester polyols and their use for the preparation of polyurethane plastics using the polyisocyanate-addition polymerization process is well known from numerous literature and patent publications. Specifically, reference is made to the *Plastics Handbook*, Vol. 7, *Polyurethanes*, 1st Ed., 1966, published by A. Hoechtlen and R. Vieweg, and the 2nd Ed., 1983, published by G. Oertel, Carl Hanser Publishers, Munchen, Vienna.

Polyester polyols are commonly prepared using polycarboxylic acids and multivalent alcohols by molten state condensation in the presence of acids or metal salts used as catalysts. The polycondensation is carried out under reduced pressure, and the water formed during the polycondensation is distilled out of the reaction mixture in order to drive the equilibrium of the reaction toward polyester formation. In this manner, polyester polyols can be prepared having acid numbers greater than 5, in relatively short reaction times.

Polyester polyols, especially those based on adipic acid and alkanediols, alkanediol mixtures or mixtures of alkanediols and higher valent alcohols, are used in large quantities for the preparation of polyurethane plastics for a variety of applications. However, these polyols suffer from certain disadvantages. One particular disadvantage is that the polyester polyols under usual storage conditions completely or partially crystallize and exhibit such high viscosity that they cannot be directly processed, at room temperature using the polyisocyanate-addition process, on conventional machines to form plastic materials. According to the prior art, the polyester polyols must be melted and homogenized in externally protected devices, and then reacted at elevated temperatures in costly temperature controlled devices. Thus, the preparation of polyurethane molded articles is more expensive.

In order to avoid this disadvantage, as disclosed in EP-PS No. 017 060, for the preparation of polyurethane elastomers, and as disclosed in U.S. Pat. No. 4,362,825 (EP-PS No. 056 122) for the preparation of flexible polyurethane foams, liquid polyester polyols are used which have hydroxyl numbers from 40 to 80, and are obtained through the polycondensation of organic dicarboxylic acids with polyol mixtures comprised of at least four di- and trivalent alcohols based on 1,4-butanediol, 1,6-hexanediol, 1,5 pentanediol, and/or diethylene glycol and an alkanetriol, such as glycerin and/or trimethylolpropane, in certain defined quantity ratios. The polyurethane elastomers obtained in this manner possess extremely favorable cold tolerance and excellent hydrolysis resistance. The elastomers also possess high mechanical sturdiness as well as very good compression permanent sets. The polyurethane flexible foams also demonstrate, in addition to improved hydrolysis resistance, very good punching ability. Such polyol mixtures are, however, relatively expensive, since the starting components are obtained partially through the reduction of the corresponding dicarboxylic acid mixtures and are only available in limited amounts for the preparation of polyester polyols. Moreover, the ability to conduct polycondensation reactions requires a certain technical aptitude.

U.S. Pat. No. 4,052,358 (DE-OS No. 26 09 208) describes pigmentable unsaturated polyester resin compositions having limited shrinkage. The polyester resin composition comprises a mixture of from 15 to 70 mole percent of neopentyl glycol and from 10 to 30 mole percent of 2,2, Bis-(4-hydroxylcyclohexyl)-propane as glycol components. The glycol components can include an additional multivalent alcohol of from 1 to 15 mole percent. A preferred multivalent alcohol is 2-methyl-1,4-butanediol.

The object of the present invention is to develop polyester polyols which are liquid at room temperature, have viscosities which are as low as possible, and which can be processed relatively problem-free on conventional machines using the polyisocyanate-addition polymerization process to form non-cellular or cellular plastics demonstrating good mechanical properties.

This objective can be surprisingly achieved by the complete or partial use of 2-methyl-1,4-butanediol as a multivalent alcohol in the preparation of polyester polyols.

SUMMARY OF THE INVENTION

This invention relates to polyester polyols which are liquid at 25° C. and contain the structure —OCH$_2$—CH(CH$_3$)—CH$_2$—CH$_2$O—. The polyester polyols are prepared through the molten state condensation of aliphatic polycarboxylic acids and/or polycarboxylic acid anhydrides and at least one multivalent aliphatic alcohol in the presence of, or in the absence of, esterification catalysts, wherein 2-methyl-1,4-butanediol or a mixture comprising of 2-methyl-1,4-butanediol and at least one linear or branched, optionally containing ether bridges, aliphatic di- or tetravalent alcohol having a 2-methyl-1,4 butanediol content of about 20 weight percent, and preferably from 40 to 80 weight percent based on the weight of the alcohol mixture, is used as the multivalent alcohol.

The polyester polyols are useful in the preparation of non-cellular or cellular polyurethane plastics or polyurethane polyurea plastics, preferably non-cellular or cellular polyurethane elastomers, using the polyisocyanate-addition process. These elastomers are hereinafter referred to as isocyanate addition polymers.

DETAILED DESCRIPTION OF THE PREFERRED EMBODIMENT

The polyester polyols of the present invention possess an average functionality of from about 2 to 3, preferably from about 2 to 2.5, an hydroxyl number of from about 25 to 300, preferably of from about 40 to 80 for elastic plastics, of from about 80 to 160 for semi-rigid plastics, and of from about 160 to 300 for rigid plastics, and have an acid number less than about 2 mg KOH/g, preferably less than about 1 mg KOH/g and most preferably from about 0.9 to 0.2 mg. KOH/g and a viscosity at about 25° C. of from about 200 to $10^5$, and preferably of from about 800 to 20,000 mPas. The non-cellular or cellular polyurethanes or polyurethane-polyurea plastics prepared from the polyester polyols, hereinafter referred to as isocyanate addition polymer plastics, possess a high mechanical property level for numerous technical applications and are characterized by particularly good hydrolysis stability and compatibility with inert, physically active, blowing agents. The term isocyanate addition polymer shall be taken to include those polymers having urethane linkages as well as those containing urethane-urea linkages.

The polyester polyols of the present invention are prepared through the polycondensation of at least one aliphatic polycarboxylic acid and/or aliphatic polycarboxylic acid anhydride, preferably an aliphatic dicarboxylic acid having from about 2 to 12 carbon atoms, particularly from about 4 to 6 carbon atoms in the alkylene radical, and 2 methyl-1,4-butanediol or mixtures comprising 2-methyl-1,4-butanediol and at least one branch, optionally containing ether bridges preferably linear, aliphatic di- or tetravalent, preferably di- or trivalent alcohol, whereby the mixture is comprised of at least about 20 weight percent of 2-methyl-1,4-butanediol. The polycondensation process may be carried out, in the absence of, or preferably, in the presence of, at least one commonly known esterification catalyst.

Suitable aliphatic dicarboxylic acids may be selected from the group consisting of dodecanoic, undecanoic, sebacic, azelaic, subaric, pimelic, adipic, glutaric, succinic, maleic, oxalic acid, their corresponding anhydrides, or a mono- and/or dicarboxylic acid ester having lower molecular alcohol having from about 1 to 4 carbon atoms, preferably from about 1 to 2 carbon atoms in the alkyl radical, or mixtures thereof. Examples of mono- and/or dicarboxylic acid esters include the dicarboxylic monoesters, dicarboxylic dimethyl esters, dicarboxylic monoethyl esters and mixtures thereof. The aliphatic dicarboxylic acid and/or dicarboxylic acid derivatives can be used individually or as mixtures. Preferably used are mixtures comprising succinic acid, glutaric acid and adipic acid, in weight ratios of from about 20 to 35:35 to 50:20 to 32, respectively. The use of adipic acid is most preferred.

Along with 2-methyl-1,4-butanediol, aliphatic di- or tetravalent alcohols may also be used in forming the polyol. The aliphatic di- or tetravalent alcohols may be selected from the group consisting of at least one branched and/or preferably linear alkane diol having from about 2 to 12 carbon atoms, preferably from about 2 to 6 carbon atoms in the alkylene radical, a polyoxyalkylene diol, preferably based on 1,2-propylene oxide ethylene oxide and mixtures thereof, having a molecular weight of from about 106 to 622, preferably of from about 106 to 262, at least one linear or branched alkane triol having from about 3 to 6 carbon atoms, pentaerythritol, and mixtures thereof.

The alkane diols may be selected from the group consisting of 2,2-dimethyl-1,3-propanediol, 2,2,4-trimethylol-1,6-hexanediol, 1,3-butanediol, ethanediol, 1,3-propanediol, 1,4-butanediol, 1,5-pentanediol, 1,6-hexanediol, 1,8-octanediol, 1,10-decanediol and 1,12-dodecanediol, and mixtures thereof.

Polyoxyalkylene diols are also useful and may be selected from the group consisting of diethylene glycol, trioxyethylene glycol, tetraoxyethylene glycol, a higher molecular polyoxyethylene glycol, dipropylene glycol, trioxypropylene glycol, tetraoxypropylene glycol and a higher molecular polyoxypropylene glycol such as polyoxypropylene-polyoxyethylene glycol and mixtures thereof. Alkane triols are also useful and may be selected from the group consisting of trimethylolethane, trimethylolpropane, glycerin and mixtures thereof.

The multivalent aliphatic alcohols, which may optionally contain ether groups, can be used individually or as mixtures. Preferred multivalent alcohols may be selected from the group consisting of ethanediol, 1,2-propanediol, 1,3-propanediol, 1,2-butanediol, 1,4-butanediol, 1,2-pentanediol, 1,5-pentanediol, 1,6-hexanediol, 1,2-hexanediol, diethylene glycol, dipropylene glycol, glycerin, trimethylol propane and mixtures thereof. When 2-methyl-1,4-butanediol is not exclusively used as the multivalent alcohol in the preparation of the said polyester polyols, the alcohol mixtures are comprised of from about 20 to 100 weight percent, preferably of from about 40 to 80 weight percent, of 2-methyl-1,4-butanediol, and from about 80 to about 0 weight percent, preferably of from about 20 to 60 weight percent, of at least one linear or branched aliphatic alcohol, which may optionally contain ether bridges.

As already stated, the aliphatic dicarboxylic acids and/or dicarboxylic acid derivatives and multivalent alcohols can be polycondensed catalyst-free or in the presence of an esterification catalyst. The esterification catalysts may be selected from the group consisting of iron, cadmium, cobalt, lead, zinc, antimony, magnesium, titanium and tin, the corresponding metal oxides, metal oxide salts, and mixtures thereof. Preferably used are tin salts, as disclosed in U.S. Pat. No. 3,162,616, incorporated herein by reference. Examples include tin dioctoate, tetrabutylorthotitanate and mixtures thereof.

In preparing the polyester polyols, the aliphatic polycarboxylic acids and/or polycarboxylic acid anhydrides and 2-methyl-1,4-butanediol, or mixtures of 2-methyl-1,4-butanediol and multivalent aliphatic alcohols, are polycondensed in a mole ratio of from about 1:1 to about 1:1.8, preferably of from about 1:1.05 to 1:1.2, catalyst-free or in the presence of an esterification catalyst, in an atmosphere consisting of inert gases, selected from the group consisting of noble gases, nitrogen, and mixtures thereof. The reaction is conducted in the molten state, at temperatures of from about 150° to 250° C., preferably from about 180° to 220° C., and, optionally, under reduced pressure, up to the desired acid number, which is preferably less than about 2. Using a preferred protocol, the esterification mixture is polycondensed at the above stated temperatures up to an acid number of from about 80 to 30, preferably from about 40 to 30, under normal pressure. The mixture is subsequently further polycondensed under a pressure of less than about 500 mbar, and preferably of from about 50 to 150 mbar. In this instance, commonly required polycondensation times are from about 10 to 30 hours, and preferably from about 15 to 20 hours.

The polyester polyols are useful for the preparation of non-cellular or cellular polyurethane or polyurethane-polyurea plastics using the polyisocyanate addition polymerization process. These plastics are termed herein as isocyanate addition polymer plastics.

For the preparation of isocyanate addition polymer plastic molded articles, the following are reacted using a conventional technical process:

(a) an organic polyisocyanate
(b) a polyester polyol of the aforementioned type, and
(c) a chain extending agent in the presence of
(d) a catalyst, and, optionally,
(e) a blowing agent,
(f) an auxiliary and/or additive.

Typical organic polyisocyanates (a) may be selected from the group consisting of aliphatic isocyanates, cycloaliphatic isocyanate, araliphatic isocyanate, aromatic isocyanates, and mixtures thereof.

Aliphatic polyisocyanates which are useful in the present invention are alkylene isocyanates having from about 4 to 12 carbon atoms in the alkylene radical. The aliphatic polyisocyanates may be selected from the group consisting of 1,12-dodecane diisocyanate, tetramethylene-1,4-diisocyanate, hexamethylene-1,6-diisocyanate, and mixtures thereof. The cycloaliphatic diisocyanates may be selected from the group consisting of cyclohexane-1,3 diisocyanate, cyclohexane-1,4-diisocyanate, their isomers, 1-isocyanato-3,3,5-trimethyl-5-isocyanatomethyl-cyclohexane (isophorondiisocyanate), 2,4- and 2,6-hexahydrotoluene-diisocyanate as well as the corresponding isomeric mixtures, 4,4'-, 2,2'-, and 2,4'-dicyclohexylmethane diisocyanate as well as the corresponding isomeric mixtures and mixtures thereof. The aromatic di- and polyisocyanate may be selected from the group consisting of 4,4'-, 2,4'- and 2,2'-diisocyanato-diphenylmethane and the corresponding isomeric mixtures, 2,4- and 2,6-diisocyanatotoluene and the corresponding isomer mixtures, polyphenyl-polymethylene-polyisocyanate, mixtures of diphenylmethane-diisocyanates and polyphenyl-polymethylene-polyisocyanates (Crude-MDI), and mixtures thereof. The di- and polyisocyanates can be used individually or in the form of mixtures.

Also useful are the so-called modified multivalent isocyanates, that is, products which are obtained through chemical reactions of the above di- and/or polyisocyanates. Examples of modified organic di- and polyisocyanates are: polyisocyanates having carbodiimide groups according to DE-PS No. 10 92 007, polyisocyanates having allophanate groups, as described in British Pat. No. 761 626 and in NL-OS No. 71 02 524; polyisocyanates possessing isocyanurate groups as described in DE-ES Nos. 10 22 789, 12 22 067, and 10 27 394, as well as in DE-OS Nos. 19 29 034 and 20 04 048, polyisocyanates possessing urethane groups as described in Belgian Pat. No. 752 261 or in U.S. Pat. No. 3,394,164, polyisocyanates possessing acylated urea groups as described in U.S. Pat. No. 1,230,778, polyisocyanates having biuret groups, as described in DE-PS No. 11 01 394 and GB-PS No. 889 050, polyisocyanates prepared by telomerization reactions, as described in Belgian Pat. No. 723 640, and polyisocyanates possessing ester groups as described in GB-PS Nos. 965 474 and 1 072 956, in U.S. Pat. No. 3,567,765 and in DE-PS No. 12 31 688. Each of these references is incorporated herein by reference. These modified multivalent isocyanates may be used individually, or in mixtures with each other or the typical organic polyisocyanate.

It is preferred to use at least one polyisocyanate containing at least one urethane group having lower molecular weight linear or branched alkanediols, dialkylene glycols or polyoxyalkylene glycols having a molecular weight of about 300 based on ethylene oxide, 1,2-propylene oxide or a mixture of ethylene oxide and propylene oxide, modified 4,4'-, 2,4'-diphenylmethane diisocyanate, 2,4-, 2,6-toluene diisocyate, or mixtures thereof, polyisocyanates containing carbodiimide groups and/or isocyanurate rings, selected from the group consisting of 4,4'-, 2,4'-diphenylmethane diisocyanate, 2,4-, 2,6-toluene diisocyanate, toluene diisocyanates, mixtures comprised of diphenylmethane-diisocyanates and polyphenyl-polymethylene polyisocyanates (Crude MDI), and mixtures thereof.

At least one difunctional organic compound may be used as a chain extending agent (c). These organic compounds may be selected from the group consisting of:
(ci) at least one primary aromatic diamine, whose primary amino groups opposite polyisocyanate are sterically hindered by 1-ortho positioned alkyl substitutent for each amino group,
(cii) at least one secondary aromatic diamine, and, preferably,
(ciii) at least one multivalent, preferably divalent alcohol and/or polyoxyalkylene polyol having molecular weights less than about 500, and preferably of from 62 to 300,
and mixtures of (ci), (cii) and (ciii). Those skilled in the art will understand that the term "chain extending agent" may also be taken to mean a crosslinking agent for the polyol. Accordingly, the term "chainlinking agent" shall also include all crosslinking agents useful in the preparation of polyols of the type contemplated by this invention.

The preferred sterically hindered primary aromatic diamines (ci) are alkyl-substituted metaphenylenediamines having the following structural formulas

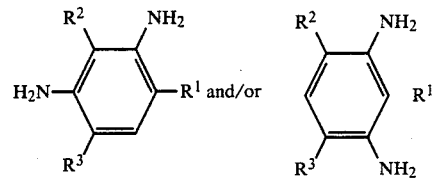

in which $R^1$ is a hydrogen atom or a linear or branched alkyl radical having from about 1 to 12 carbon atoms, preferably about 1 to 6 carbon atoms, and R and $R^3$ are the same or different, linear or branched alkyl radicals having from about 1 to 4 carbon atoms, selected from the group consisting of methyl, ethyl, propyl, isopropyl, butyl, sec-butyl, or mixtures thereof.

Preferably $R^1$ is an alkyl radical in which the branched position is on the $C_1$ carbon atom. The $R^1$ alkyl radical may be selected from the group consisting of hydrogen, methyl, ethyl, n- and isopropyl, butyl, hexyl, octyl, decyl, 1 methyl-octyl, 2-ethyl-octyl, 1 methylhexyl, 1,1-dimethyl-pentyl, 1,3,3-trimethyl-hexyl, 1 ethyl-pentyl, 2-ethyl-pentyl and preferably cyclohexyl, 1-methyl-n-propyl, tert. butyl, 1-ethyl-n-propyl, 1 methyl-n-butyl, 1,1-dimethyl-n-propyl and mixtures thereof.

The alkyl-substituted n-phenylenediamines may be selected from the group consisting of 2,4-dimethyl, 2,4-diethyl, 2,4-diisopropyl, 2,4-diethyl-6-methyl, 2-methyl-4,6-diethyl, 2,4,6-triethyl, 2,4-dimethyl-6-cyclohexyl, 2 cyclohexyl-4,6-diethyl, 2-cyclohexyl-2,6-diisopropyl, 2,4-dimethyl-6-(1-ethyl-n-propyl), 2,4-dimethyl-6-(1-dimethyl-n-propyl), 2-(1-methyl-n-butyl-4,6-dimethyl-1,3-phenylenediamine, and mixtures thereof.

Alkyl substituted diamino-diphenylmethanes are also useful. These may be selected from the group consisting of 3,3'-di- and 3,3',5,5'-tetra-n-alkyl substituted 4,4'-diamino-diphenylmethane, and mixtures thereof. A preferred alkyl substituted diamino-diphenylmethane is 3,3',5,5'-tetra-n-propyl-4,4'-diamino-diphenylmethane.

Diamino-diphenylmethanes are also useful in the present invention. Such diamino-diphenylmethanes have the following structural formula

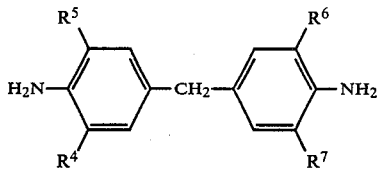

in which $R^4$, $R^5$, $R^6$ and $R^7$ are the same or different and stand for a methyl, ethyl, propyl, isopropyl, sec-butyl and tert-butyl radicals, whereby, however, at least one of these radicals must be an isopropyl or a sec-butyl radical. The alkyl substituted 4,4'-diamino-diphenylmethanes can also be used in mixtures with isomers having the following formulas

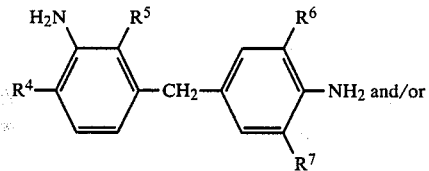

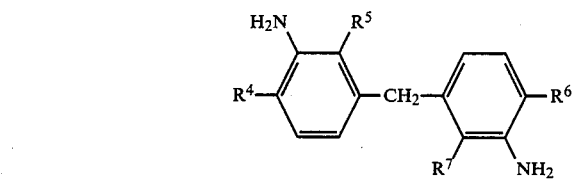

whereby $R^4$, $R^5$, $R^6$ and $R^7$ have the above stated meaning.

Suitable diamino-diphenylmethanes may be selected from the group consisting of 3,3'-trimethyl-5'-isopropyl, 3,3',5-triethyl-5'-isopropyl 3,3'-trimethyl-5'-sec-butyl, 3,3'-triethyl-5'-sec-butyl-4,4'-diamino-diphenylmethane, 3,3'-dimethyl-5,5' diisopropyl, 3 3'-diethyl-5 5'diisopropyl, 3,3'-dimethyl-5,5'-di-sec-butyl, 3,3'-diethyl-5,5'-di-sec-buytl, 3,5-dimethyl-3',5'-diisopropyl, 3,5-diethyl-3',5'-dimethyl-3',5'-di-sec-butyl, 3,5-diethyl-3',5'-di-sec-butyl-4 4'-diamino-diphenylmethane, 3-methyl-3',5,5'-triisopropyl, 3-ethyl-3',5,5'-triisopropyl, 3-methyl-3'-5,5'-tri-sec-butyl, 3 ethyl-3',5,5' tri-sec-butyl-4,4'-diamino-diphenylmethane, 3,3'-diisopropyl-5,5'-di-sec-butyl, 3,5-diisopropyl-3',5'-di-sec-butyl, 3-ethyl-5-sec-butyl-3',5'-diisopropyl, 3-methyl-5-tert-butyl-3' 5'-diisopropyl, 3-ethyl-5-sec-butyl 3'-methyl-5'-tert-butyl, 3,3',5,5'-tetraisopropyl and 3,3',5,5'-tetra-sec-butyl-4,4'-diamino-diphenylmethane and mixtures thereof.

Preferred primary aromatic diamines may be selected from the group consisting of 2,4'diethyl-, 2,4-dimethyl-1,3-phenylenediamine, 2,4-diethyl-6-methyl-, 2-methyl-4,6-diethyl-1,3-phenylenediamine, 2,4,6-triethyl-1,3-phenylenediamine-, 2,4-dimethyl-6-tert-butyl-, 2,4-dimethyl-6-isooctyl and 2,4-dimethyl-6-cyclohexyl-1,3-phenylenediamine, 3,5-dimethyl-3',5' diisopropyl- and 3,3',5,5'-tetraisopropyl-4,4'-diamino-diphenylmethane, and mixtures thereof.

The primary aromatic diamines (ci) which can be used are selected from the group consisting of alkyl substituted 1,3-phenylenediamines, 3,3'-di and/or 3,3'5,5'-tetra-alkyl substituted 4,4'-diamino-diphenylmethanes, and mixtures thereof.

Suitable secondary aromatic diamines (cii) may be selected from the group consisting of N,N'-dialkyl substituted aromatic diamines, which optionally can be substituted by an alkyl radical on the aromatic ring, having from about 1 to 20, preferably from about 1 to 4 carbon atoms, in the alkyl radical, N,N'-diethyl-, N,N'-di-sec-pentyl-, N,N'-sec-hexyl, N,N'-di-sec-decyl-, N,N'-dicyclohexyl-p-, respectively -m-phenylenediamine, N N'-dimethyl-N,N'-diethyl-, N,N'-diisopropyl-, N,N'-di-sec-butyl, N,N dicyclohexyl 4,4'-diamino-diphenylmethane and N,N'-di-sec-butyl-benzidine, and mixtures thereof.

Suitable multivalent alcohols and/or polyoxyalkylene polyols (ciii) may be selected from the group consisting of aliphatic and/or araliphatic diols having from about 2 to 14, preferably from about 2 to 6 carbon atoms, 1,3-propanediol, 1,4-decanediol, diethylene glycol, dipropylene glycol, bis(2-hydroxyethyl)-hydroquinone, ethylene glycol, 1,4 butanediol, 1,6-hexanediol, triols such as glycerin and trimethylolpropane, and lower molecular polyoxyalkylene polyols based on ethylene and/or 1,2-propylene oxide and the previously mentioned initiator molecules, and mixtures thereof.

The chain extending agent (c) can be added individually or in the form of mixtures of (ci), (cii) and (ciii) and is used in quantities of from about 5 to 50 parts by weight, preferably from about 10 to 40 parts by weight, and most preferably from about 15 to 30 parts by weight based on 100 parts by weight of the polyester polyols (b). Inasmuch as mixtures comprised of sterically hindered aromatic diamines (ci), sec-aromatic diamines (cii) and multivalent alcohols (ciii) are used, these contain from about 1 to 40, preferably from about 5 to 20, parts by weight of the components (cii) and/or (ciii) per 100 parts by weight of the components (ci). Preferred chain extending agents are lower molecular weight diols (ciii) or diamines (ci), which contain at least one alkyl radical in bonded form in the ortho position relative to the amino groups.

Suitable catalysts (d) are those which strongly accelerate the reaction of the polyester polyols (b) and the compounds of components (ciii), which optionally contain hydroxyl groups, with the polyisocyanates. Organic metal compounds are the catalysts of choice. The preferred organic metal catalysts are organic tin compounds selected from the group consisting of tin(II)salts of organic carboxylic acids, tin(II)acetate, tin(II)octoate, tin(II)ethyl hexoate, and tin(II)laurate, and mixtures thereof, the dialkyl tin(IV)salts of organic carboxylic acids, selected from the group consisting of dibutyltin diacetate, dibutyltin dilaurate, dibutyltin maleate, dioctyltin diacetate, and mixtures thereof. The organic metal compounds can be used alone or, preferably, in combination with strongly basic amines. The amidines may be selected from the group consisting of 2,3-dimethyl-3,4,5,6-tetrahydropyrimidine, tertiary amines, such as triethyl amine, tributylamine, dimethylbenzylamine, N-methyl-, N-ethyl-, N-cyclohexylmorpholine, N,N,N',N'-tetramethyl-ethylenediamine, N,N,N',N'-tetramethyl-butanediamine, pentamethyl-diethylenetriamine, tetramethyl-diaminoethylether, bis-(dimethylaminopropyl)urea, dimethylpiperazine, 1,2-dimethylimidazole, 1-azabicicylo-[3.3.0]-octane, 1,4-diaxabicyclo-[2.2.2]-octane, and mixtures thereof. Alkanolamine compounds may also be used. These are selected from the group consisting of triethanolamine, triisopropanolamine, N-methyl and N-ethyldiethanolamine, dimethylethanolamine and mixtures thereof.

Additional catalysts may be selected from the group consisting of tris-(dialkylaminoalkyl)-3-hexahydrotriazines, tris-(N,N-dimethylaminopropyl)-s-hexahydrotriazine, tetra alkyl ammonium hydroxides, such as tetramethyl ammonium hydroxide, alkali hydroxides, such as sodium hydroxide and alkali alcoholates, such as sodium methylate, potassium isopropylate such as alkali salts of long chained fatty acids having from about 10 to 20 carbon atoms and optionally lateral OH groups, and mixtures thereof. The catalyst is present in as small as catalytically effective amount as possible, and preferably in an amount of from about 0.001 to 5 weight percent, and more preferably from about 0.05 to 2 weight percent of catalyst or a catalyst combination based on the weight of the (b) components.

Water is the preferred blowing agent (e) which can be used for the preparation of cellular plastic molded articles. Water reacts with isocyanate groups to form carbon dioxide. The amount of water which is preferred is from about 0.5 to 2 weight percent based on the weight of the (b) components.

Other suitable blowing agents are low boiling point liquids which evaporate as a result of the exothermic addition polymerization reaction. These liquids are inert to the organic polyisocyanate and have boiling points under about 100° C. The low boiling point liquids may be selected from the group consisting of halogenated hydrocarbons such as methylene chloride, trichlorofluoromethane, dichlorodifluoromethane, dichloromonofluoromethane, dichlorotetrafluoroethane, 1,1,12-trichlor-1,2,2-trifluoroethane, and mixtures thereof.

Mixtures of these low boiling point liquids can be used in combination with other substituted or unsubstituted hydrocarbons.

The desired amount of low boiling point liquid to be used in preparing the cellular isocyanate addition polymer molded articles depends on the desired density, as well as optionally, on the co-use of water. In general, the low boiling point liquid is present in amounts of from about 0.5 to 15 parts by weight, based on 100 parts by weight of the (b) components.

Auxiliaries and/or additives (f) can also be incorporated into the reaction mixture. Typical examples are surfactants, internal mold release agents, foam stabilizers, cell regulators, fillers, colorants, pigments, flame retardants, antihydrolysis agents, fungistats and bacteriostatic agents.

Surfactants which may be used are those which assist in the homogenation of the starting components and which, optionally, regulate the cell structure. Typical examples are emulsifiers such as the sodium salts of castor oil sulfates or of fatty acids as well as salts of fatty acids, amines, such as oleic acid diethylamine or stearic acid diethanolamine, salts of sulfonic acids, such as alklior ammonium salts of dodecylbenzene- or dinaphthylene methane disulfonic acids, ricinoleic acids and mixtures thereof; foam stabilizers, such as siloxane-oxyalkylene-mixed polymers and other organo-polysiloxanes, oxyethylated alkylphenols, oxyethylated fatty alcohols, paraffin oils, castor oil, castor oil ester, Turkey red oil, and cell regulators such as paraffin, fatty alcohols and dimethylpolysiloxanes. The surfactants are commonly employed in quantities from about 0.01 to 5 parts by weight based on 100 parts by weight of the (b) components. They may be employed individually or as mixtures.

Suitable internal mold release agents are carboxylic esters and/or carboxylic amides which are prepared through the esterification or amination of a mixture comprised of montanic acid and at least one aliphatic carboxylic acid having at least about 10 carbon atoms with at least difunctional alkanolamines, polyols and/or polyamines having molecular weights of from about 60 to 400, and mixtures thereof.

Fillers, in particular reinforcing fillers, are understood to be the known organic and inorganic fillers, reinforcing substances, weight-increasing substances, substances for improving the wear resistance in paints, coatings, etc. Typical examples of inorganic fillers are: silicate minerals, for example laminar silicates such as antigorite, serpentine, horn blends, amphibole, chrisotile, talcum; metal oxides such as kaolin, aluminum oxides, titanium oxides and iron oxides, metal salts such as chalk, heavy spar and inorganic pigments, such as cadium sulfide, zinc sulfide, as well as glass, powdered asbestos, kaolin (China clay), aluminum silicate, coprecipitates of barium sulfate and aluminum silicate, as well as natural and synthetic fibrous minerals, such as asbestos and Wollastonite, glass fibers of different lengths which optionally can be sized, and mixtures thereof. Typical organic fillers may be selected from the group consisting of coal, melamine, pine resin, cyclopentadiene resins and graft polymers based on styrene-acrylnitrile, which are prepared through in-situ polymerization of acrylnitrile-styrene mixtures in polyetherols analogous to the disclosures of the German Pat. Nos. 11 11 394, 12 22 669 (U.S. Pat. Nos. 3,304,273; 3,383,351; 3,523,093), 1,152,536 (GB No. 1 040 452) and 1,152,537 (GB No. 987 618), as well as filler-polyoxyalkylene polyols, in which aqueous polymer dispersions are converted to polyoxyalkylene-polyol dispersions, and mixtures thereof.

The inorganic and organic fillers are incorporated into the reaction mixture in amounts of from about 0.5 to 50 weight percent, and preferably from about 1 to 40 weight percent, based on the weight of the components (a) through (c).

Suitable flame retardants may be selected from the group consisting of tricresylphosphate, tris-2-chloroethyl phosphate, tris-chloropropyl phosphate, tris-2,3-dibromopropyl phosphate, and mixtures thereof.

In addition to the aforementioned halogen-substituted phosphates, inorganic flame retardants can also be used for flameproofing the plastics and/or molded articles. These flame retardants include aluminum hydroxide, antimony trioxide, ammonium polyphosphate, and calcium sulfate, and mixtures thereof. It has generally proven useful to use from about 5 to 50 parts by weight, and preferably from about 5 to 25 parts by weight, of the flame retardant for each 100 parts by weight of the (b) components.

Further information concerning the above mentioned other common auxiliary agents and additives can be obtained from the monograph of J. H. Saunders and K. C. Frisch, *High Polymers,* Vol. XVI, *Polyurethanes,* Parts 1 and 2, Interscience Publishers 1962 and 1964 respectively.

In preparing the cellular and/or noncellular isocyanate addition polymer plastic molded articles, an organic polyisocyanate (a), a polyester polyol (b), and a chain extending agent (c) are reacted so that the equivalent ratio of NCO groups of the polyisocyanate (a) to the total of the reactive hydrogen atoms of components (b) and (c) is from about 1:0.85 to 1:1.25, and preferably from about 1:0.95 to 1:1.15.

The non-cellular and preferably cellular isocyanate addition polymer molded articles may be made using the prepolymer process or preferably using the one-shot process, whereby polyurethane molded articles are prepared by way of low pressure technology and polyurethane-polyurea molded articles are prepared by way of reaction injection molding technology.

These types of processes are described, in the following references: *Integral Skin Foams,* Piechota and Rohr, Carl-Hanser, publishers, Munich, Vienna 1975: *Journal of Cellular Plastics,* D. J. Prepelka and J. L. Wharton, March/April, 1975, pp. 87 through 98, and in the *Journal of Cellular Plastics,* U. Knipp, March/April 1973, pp. 76 through 84.

When using a mixing chamber with several feed nozzles, the starting components are fed into the mixing chamber individually and mixed intensively. It is particularly useful to work according to the two-component process, and to dissolve the chain extending agent (c) and catalyst (d) in the polyester polyol (b) and optionally with the blowing agent (e); incorporate auxiliary and/or additive (f) to form the (A) component and to use an organic, optionally modified, polyisocyanate as the (B) component. An advantage in this instance is that the (A) and (B) components can be stored separately and transported in a space-saving manner, and only the corresponding amounts need be mixed together during processing.

In preparing the isocyanate addition polymer molded articles, the amount of reaction mixture injected into the mold is measured, so that the resulting non-cellular molded articles have a density of from about 1.0 to 1.4 g/cm$^3$, preferably from about 1.0 to 1.2 g/cm$^3$, and the cellular molded articles have a density of from about 1.2 to 1.1 g/cm$^3$. When it is desired to make microcellular molded articles, the articles preferably have a density of about from about 0.8 to 1.0 g/cm$^3$, shoe soles preferably having a density of about 0.4 to 0.65 g/cm$^3$, and microcellular plastics preferably having a density of from about 0.25 to 0.4 g/cm$^3$. The initial components are injected into the mold at a temperature of from about 15° to 80° C., preferably from about 20° to 60° C., and especially from about 25° to 55° C. The mold temperature is from about 20° to 100° C., and preferably from about 30° to 80° C. The degree of compression in preparing the microcellular or cellular mold articles lies between about 1.1 and 8, and preferably between about 2 and 8.

The non-cellular and cellular polyurethanepolyurea molded articles obtained through the process of the present invention are particularly useful in the automobile industry. For example, they are useful as bumper coverings, impact protection moldings, body parts, such as drip moldings, fenders, spoilers and wheel extensions, as well as engineering housing components and rollers and shoe soles. The cellular foams are also useful in the production of arm rests, head rests, safety coverings in the interior of the automobiles, as well as motorcycle and bicycle seats and for coverings in composite foams.

The parts cited in the following examples refer to parts by weight. Those skilled in the art understand that the examples are offered to illustrate various aspects of the invention. Accordingly, they are not to be construed as limiting in any way the scope and spirit of the invention.

PREPARATION OF THE SAID POLYESTER POLYOLS

EXAMPLE 1

One hundred parts by weight of adipic acid, 31.1 parts by weight of ethanediol, and 26.1 parts by weight of 2-methyl-1,4-butanediol were esterified under normal pressure and by distilling off the condensation water at temperatures up to 220° C. Subsequently, the polycondensation was completed by lowering the pressure to about about 40 mbar. After separating 24.6 parts by weight of water, ethanediol-2-methyl-1,4-butanediol-polyadipate was obtained which was liquid at room temperature and which had the following characteristic data:

| | |
|---|---|
| Hydroxyl No. | 54.9 mg KOH/g |
| Acid No. | 0.8 mg KOH/g |
| Viscosity at 25° C. | 8797 mPas |
| Viscosity at 75° C. | 521 mPas |
| Iodine color No. | 1 to 2 |

EXAMPLES 2 TO 4 AND COMPARATIVE EXAMPLES A THROUGH C

The procedure of Example 1 was used to mix the materials of Example 1 in the quantities summarized in Table I and shown therein as Examples 2 through 4 and Comparative Examples A through C. As depicted in Examples 2 through 4, polyadipates, which are liquid at room temperature, were produced. The polyadipates, formed according to Comparative Examples A through C, were solid at room temperature. The hydroxyl numbers, acid numbers, viscosity at 25° C., viscosity at 75° C., and iodine color number are the same for Examples 2 through 4 and Comparative Examples A through C as set forth in Example 1.

TABLE I

| | Examples | | | Comparative Examples | | |
|---|---|---|---|---|---|---|
| | 2 | 3 | 4 | A | B | C |
| Initial Components | | | | | | |
| Adipic Acid (parts by wt.) | 100 | 100 | 100 | 100 | 100 | 100 |
| 1,4-Butanediol (parts by wt.) | 34.2 | 43.5 | 45.8 | 33.8 | — | 44.6 |
| 2-Methyl-1,4-butanediol (parts by wt.) | 39.5 | 29 | 49.7 | — | — | — |
| Ethanediol (parts by wt.) | — | — | — | 23.3 | — | 15.3 |
| Neopentyl glycol (parts by wt.) | — | — | — | — | 28.5 | — |
| 1,6-Hexanediol (parts by wt.) | — | — | — | — | — | — |
| Characteristic Data | | | | | | |
| Hydroxyl # (mg KOH/h) | 55.5 | 56.2 | 195 | 56 | 56.1 | 56.5 |
| Acid # (mg KOH/h) | 0.8 | 0.7 | 0.5 | 0.6 | 0.9 | 0.5 |

TABLE I-continued

|  | Examples | | | Comparative Examples | | |
|---|---|---|---|---|---|---|
|  | 2 | 3 | 4 | A | B | C |
| Viscosity: 25° C. (mPas) | 8556 | 9102 | 785 | — | — | — |
| Viscosity: 75° C. (mPas) | 616 | 621 | — | 650 | 655 | 693 |
| Iodine Color # | <1 | <1 | <1 | — | — | — |
| State of Aggregation at Room Temperature | liquid | liquid | liquid | solid | solid | solid |

EXAMPLES 5 AND COMPARATIVE EXAMPLES D AND E

In determining the compatibility of trichlorofluoromethane, the maximum soluble amount of blowing agent was determined in a characteristic polyurethane rigid foam formulation. This was determined by varying the amount of polyester polyol and determining the extent of turbidity which occurred in the formulation.

| Examples/ Comparative Example | Polyester Polyol A polyester prepared from | Solubility of Trichlorofluoromethane in an Isocyanate Addition Rigid Foam Formulation (g) Containing 100 g of the Stated Polyester Polyol |
|---|---|---|
| 5 | 1,4-Butanediol, 2-methyl-1,4-butane diol, and adipic acid according to Example 4 | 50 |
| D | Ethanediol polyadipate | 21 |
| E | Diethylene glycol phthalate [NIAX ® APP 315] | 15 |

EXAMPLES 6a AND 6B

Polyurethane formulations for preparing shoe soles were made according to the following procedure.
A-Component:
A mixture comprised of
87.7 parts by weight of a polyester polyol
9.0 parts by weight of ethylene glycol
1.0 parts by weight of a 33 weight percent solution of triethylene-diamine in ethylene glycol
0.2 parts by weight of water
2.0 parts by weight of 1,1,2-trichloro-1,2,2,-trifluoroethane
B-Component:
A prepolymer having an NCO content of 18.7 was prepared from the said ethanediol-2-methyl-1,4-butanediol polyadipate according to Example 1 and 4,4'-diphenylmethanediisocyanate.

In preparing the shoe soles, 100 parts by weight of the A component and 92.5 parts by weight of B component were mixed intensively at room temperature, injected in a conventional fashion into a metal mold heated at 40° C., and allowed to cure in the closed mold. Equally good processing was possible using both low and high pressure processes because of the low viscosity of the polyester polyol. The resulting cellular polyurethane elastomers were characterized by excellent mechanical properties, particularly by low cold flexibility and very good hydrolysis stability.

The mechanical properties measured from the molded articles are summarized in Table II.

TABLE II

| Example | 6a | 6b |
|---|---|---|
| A polyester prepared from 1,4-butanediol, 2-methyl-1,4-butanediol and adipic acid made according to Example | 1 | 2 |
| Mechanical Properties | | |
| Repeated flexural stress behavior after 30000 load cycles | satisfactory | satisfactory |
| Repeated flexural stress behavior at −30° C. after 30000 load cycle | satisfactory | satisfactory |
| Elongation according to DIN 53 504 [%] | 460 | 470 |
| Tear propagation strength according to Graves and according to DIN 53 515 [N/mm] | 13.5 | 14.2 |
| Tensile Strength according to DIN 53 504 [N/mm$^2$] | 9.8 | 10.0 |

The embodiments of the invention in which an exclusive property or privilege is claimed are defined as follows:

1. A process for making a polyester polyol which is liquid at room temperature and is useful for forming noncellular or cellular isocyanate addition polymer plastics, comprising:
    polycondensing in the molten state at least one aliphatic polycarboxylic acid or a polycarboxylic acid anhydride, and 2-methyl-1,4-butanediol, or a mixture of 2-methyl-1,4-butanediol and a multivalent aliphatic alcohol selected from the group consisting of a linear or branched, aliphatic di-, tri- and tetravalent alcohol, and mixtures thereof,
    whereby, the polyester polyol contains units having the structure —OCH$_2$—CH(CH$_3$)—CH$_2$—CH$_2$O—, an average functionality of from about 2 to 3, a hydroxyl number of from about 25 to 300, an acid number less than about 2 and a viscosity at 25° C. of about 200 to 10$^5$ mPas.

2. The process according to claim 1, further including an esterification catalyst.

3. The process according to claim 1 wherein the aliphatic polycarboxylic acids or their anhydrides are selected from the group consisting of succinic acid, glutaric acid, adipic acid, oxalic acid, pimelic acid, subaric acid, azelaic acid, sebacic acid, undecanoic acid, dodecanoic acid, mono- and dicarboxylic acid esters having from about 1 to 4 carbon atoms in the alkyl radical, the corresponding anhydrides, and mixtures thereof.

4. The process according to claim 1 wherein said aliphatic polycarboxylic acids or their anhydrides are a mixture comprised of succinic acid, glutaric acid, and adipic acid in weight ratios of from about 20 to 35; 35 to 50; and 20 to 32, respectively.

5. The process according to claim 1 wherein the mixture of multivalent aliphatic alcohols is comprised of
    (a) about 20 to 100 percent by weight of 2-methyl-1,4-butanediol; and
    (b) about 80 to 0 percent by weight of at least one linear or branched alkanediol having from about 2 to 12 carbon atoms, a polyoxyalkylenediol having a molecular weight of about 106 to 622, a linear or branched alkanetriol having from about 3 to 6 carbon atoms, pentaerythrite, and mixtures thereof.

6. The process according to claim 1 wherein the mixture of multivalent aliphatic alcohols is comprised of
(a) about 20 to 100 percent by weight of 2-methyl-1,4-butanediol; and,
(b) about 80 to 0 percent by weight of ethanediol, 1,2-, 1,3-propanediol, 1,4-butanediol, 1,5-pentanediol, 1,6-hexanediol, diethylene glycol, dipropylene glycol, glycerin, trimethylolpropane and mixtures thereof.

7. The process of claim 1 wherein the 2-methyl-1,4-butanediol and the other multivalent alcohols are polycondensed in a mole ratio of about 1:1 to about 1:1.8 in an atmosphere of inert gases for about 10 to 30 hours.

8. A polyester polyol made according to the process of claim 1.

9. A process for making cellular or noncellular isocyanate addition polymer plastic molded articles, comprising reacting:
(a) an organic polyisocyanate;
(b) a polyester polyol, which is liquid at room temperature and contains units having the structure —OCH$_2$—CH(CH$_3$)—CH$_2$—CH$_2$O—, an average functionality of from about 2 to 3, a hydroxyl number of from about 25 to 300, an acid number less than about 2, and a viscosity at 25° C. of about 200 to 10$^5$ mPas;
(c) a chain extending agent; and,
(d) an amidine catalyst present in a catalytically effective amount, selected from the group consisting of sodium hypochlorite 2,3-dimethyl-3,4,5,6-tetrahydropyrimidine, triethylamine, tributylamine, dimethylbenzylamine, N-methylhexylmorpholine, N-ethylhexylmorpholine, N-cyclohexylmorpholine, N,N,N',N'-tetramethylethylenediamine, N,N,N',N'-tetramethylbutanediamine, pentamethyl-diethylenetriamine, tetramethyldiaminoethyl ether, bis-(dimethylaminopropyl)urea, dimethylpiperazine, 1,2-dimethylimidazole, 1-azo-bicyclo[3.3.0]octane, 1,4-dioxabicyclo[2.2.2]octane and mixtures thereof
whereby the equivalent ratio of NCO groups of the polyisocyanate (a) to the total reactive hydrogen atoms of (b) and (c) is from about 1:0.85 to 1:1.25.

10. The process of claim 9, further including a blowing agent.

11. The process of claim 9, further including an additive and/or auxiliary.

12. The process of claim 9, wherein the polyester polyol is made according to the process of claim 1.

13. The process according to claim 12, wherein the mixture of 2-methyl-1,4-butanediol and multivalent aliphatic alcohols is comprised of:
(a) about 20 to 100 percent by weight of 2-methyl-1,4-butanediol; and
(b) about 80 to 0 percent by weight of at least one linear or branched alkanediol having from about 2 to 12 carbon atoms, a polyoxyalkylenediol having a molecular weight of about 106 to 622, a linear or branched alkanetriol having from about 3 to 6 carbon atoms, pentaerythrite and mixtures thereof.

14. The process according to claim 12 wherein the mixture of 2-methyl-1,4-butanediol and multivalent aliphatic alcohols is comprised of:
(a) about 20 to 100 percent by weight of 2-methyl-1,4-butanediol; and,
(b) about 80 to 0 percent by weight of ethanediol, 1,2-,1,3-propanediol, 1,4-butanediol, 1,5-pebtanediol, 1,6-hexanediol, diethylene glycol, dipropylene glycol, glycerin, trimethylolpropane and mixtures thereof.

15. The process according to claim 12 wherein the mixture of 2-methyl-1,4-butanediol and multivalent aliphatic alcohols are polycondensed in a mole ratio of about 1:1 to about 1:1.8 in an inert atmosphere for about 10 to 30 hours.

16. A cellular isocyanate addition polymer plastic molded article made according to the process of claim 9.

17. A noncellular isocyanate addition polymer plastic molded article made according to the process of claim 9.

* * * * *